United States Patent
Zolotykh et al.

(10) Patent No.: US 6,553,551 B1
(45) Date of Patent: Apr. 22, 2003

(54) TIMING RECOMPUTATION

(75) Inventors: Andrej A. Zolotykh, Moskovskaya Oblast (RU); Elyar E. Gasanov, Moscow (RU); Ivan Pavisic, San Jose, CA (US); Aiguo Lu, Cupertino, CA (US)

(73) Assignee: LSI Logic Corporation, Milpitas, CA (US)

( * ) Notice: Subject to any disclaimer, the term of this patent is extended or adjusted under 35 U.S.C. 154(b) by 150 days.

(21) Appl. No.: 09/841,825

(22) Filed: Apr. 25, 2001

(51) Int. Cl.[7] .............................................. G06F 17/50

(52) U.S. Cl. .......................................................... 716/6

(58) Field of Search ......................................... 716/1–6

(56) References Cited

U.S. PATENT DOCUMENTS 6,385,759 B1 * 5/2002 Batarekh ....................... 716/2

* cited by examiner

Primary Examiner—Cuong Quang Nguyen
(74) Attorney, Agent, or Firm—Luedeka, Neely & Graham

(57) ABSTRACT

A method of computing timing delays of timing edges of a path of an integrated circuit design. According to the method, all pins within the path are identified, and all timing edges defined by the pins within the path are identified. All pins within the path that are a leading pin of one of the time edge in the path are also identified. For each given pin within the path, a tabulation is made of a number of pins that are upstream from the given pin along a contiguous series of the timing edges in the path. A computational rank is assigned to the given pin based upon the tabulated number for the given pin. The timing edges are ordered for computation based upon the computational rank of the leading pin of each timing edge in the path, to produce an ordered list of timing edges. The timing delays of the timing edges of the path are computed according to the ordered list of timing edges.

11 Claims, 1 Drawing Sheet

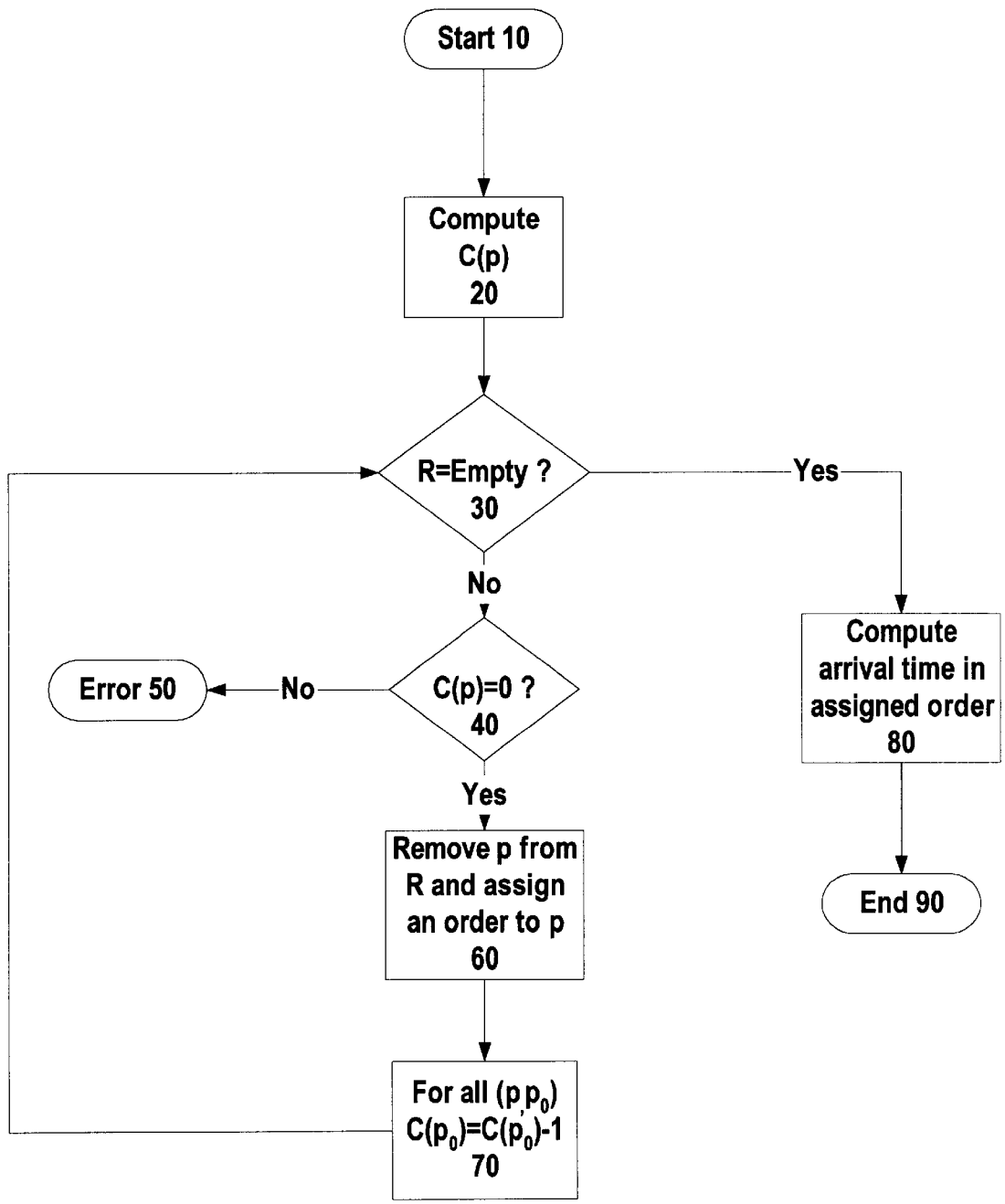

TIMING RECOMPUTATION

FIELD

This invention relates to the field of integrated circuit design. More particularly the invention relates to optimizing circuit design based on circuit timing.

BACKGROUND

When integrated circuits such application specific integrated circuits are designed, they typically undergo an optimization process. During the optimization process, different characteristics of the integrated circuit are tested to determine whether they meet the design criteria for the integrated circuit. If all of the tested characteristics of the integrated circuit meet all of the design criteria, then perhaps the design of the integrated circuit is not altered. More commonly, however, the characteristics of the integrated circuit are tested and then the design of the integrated circuit is modified in some specific manner, in an iterative procedure called optimization that is intended to optimize at least a given set of the tested characteristics, as referenced against the design criteria. This iterative procedure is often referred to as a resynthesis of the integrated circuit.

One of the characteristics of the integrated circuit that is typically tested is the timing of the integrated circuit. The timing of the integrated circuit relates generally to the temporal relationships between the various electrical signals that are applied at different times to different subsets of elements within the integrated circuit. For example, a given design for an integrated circuit typically specifies that certain electrical signals arrive at certain elements within the integrated circuit within specified time boundaries, in order for the integrated circuit to produce the proper response according to the design criteria. Thus, testing of the integrated circuit for the proper temporal relationships of the applied and produced electrical signals, and then modifying the integrated circuit in an attempt to optimize those temporal relationships is called timing driven resynthesis herein.

Because of the complexity of state of the art integrated circuits, the timing driven resynthesis process may comprise an extreme number of the iterative procedures described above. What is needed, therefore, is a method whereby the temporal characteristics of the various electrical signals can be determined in a relatively short length of time, so that the iterative process of timing driven resynthesis can proceed without undue delay.

SUMMARY

The above and other needs are met by a method of computing timing delays of timing edges of a path of an integrated circuit design. According to the method, all pins within the path are identified, and all timing edges defined by the pins within the path are identified. All pins within the path that are a leading pin of one of the time edges in the path are also identified. For each given pin within the path, a tabulation is made of a number of pins that are upstream from the given pin along a contiguous series of the timing edges in the path. A computational rank is assigned to the given pin based upon the tabulated number for the given pin. The timing edges are ordered for computation based upon the computational rank of the leading pin of each timing edge in the path, to produce an ordered list of timing edges. The timing delays of the timing edges of the path are computed according to the ordered list of timing edges.

In this manner, the timing edges are ordered for either initial computation or recomputation so that dependent timing computations are not accomplished prior to the more independent computations on which they ultimately depend. This method produces a fast timing recomputation procedure whereby the often repeated timing recomputation procedure does not take an unduly long period of time to accomplish.

According to another aspect of the invention, there is presented a method of resynthesizing an integrated circuit design. A timing output cone is identified based on a starting set of pins of the integrated circuit design, and a timing input cone is identified based on an ending set of pins of the integrated circuit design. The timing input cone and the timing output cone are intersected to produce an intersection defining a path. The timing delays of timing edges of the path are computed using the method as described above. The arrival times of the pins of the path are computed based on the timing delays of the timing edges of the path, and the departure times of the pins of the path are also computed based on the timing delays of the timing edges of the path. The total delay of the path is computed from the arrival times and the departure time of the pins of the path. The total delay of the path is compared to a required time of the path. If the total delay of the path is greater than the required time of the path, then a change is made to the integrated circuit design, and the total delay of the path is recomputed in an iterative fashion until the total delay of the path is no greater than the required time of the path.

According to another aspect of the invention, a computer program and a computing device for computing timing delays of timing edges of a path of an integrated circuit design are also described.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein the FIGURE is a flow chart of a resynthesis enumeration procedure.

DETAILED DESCRIPTION

Design specifications preferably contain descriptions of at least one, and typically many, timing intervals. A timing interval generally relates to a set of electrical signals that are propagated through an integrated circuit, preferably to accomplish some specific function of the integrated circuit, and which is preferably accomplished within a certain given time, as given by the design specification. Thus, a given integrated circuit will typically have many different timing intervals. Typically, the electrical signals of the timing interval follow several different current paths through the integrated circuit. These different current paths may cross or otherwise intersect each other at various points within the integrated circuit. The paths are defined as a set of pins within the integrated circuit. A pin is an input or output of a component element or block of component elements within the integrated circuit. Thus, during a given timing interval I, a number of electrical signals will follow electrical paths defined by sets of pins through the integrated circuit.

The description of the timing interval I preferably includes at least a description of a starting pin set $P_S(I)$ of the timing interval I and an ending pin set $P_E(I)$ of the timing interval I. Each path of the timing interval I starts on one of the pins in the set of starting pins $P_S(I)$ and ends on one of the pins in the set of ending pins $P_E(I)$. Typically, there are intervening pins disposed between the starting pins $P_S(I)$ and the ending pins $P_E(I)$ along the various paths. For each pin of the integrated circuit that is contained in the set of starting pins $P_S(I)$ there is a starting time $T_{Start}(p,I)$, which is the time at which the electrical signal of the timing interval I is first applied to the pin. Similarly, For each pin of the integrated circuit that is contained in the set of ending pins $P_E(I)$ there is an ending time $T_{End}(p,I)$, which is the time at which the electrical signal of the timing interval I is last applied to the pin.

There may also be a set of pins $P_F(I)$ that trigger during the timing interval I, but which are not intended to be included within any of the paths of the timing interval I. These pins $P_F(I)$ are called the false pins of the timing interval I. A sequence of pins $p_0 p_1, p_2, \ldots p_{n-1}, p_n$ is a path of the timing interval I if the pin $p_0$ belongs to the starting pin set $P_S(I)$, and the pin $p_n$ belongs to the ending pin set $P_E(I)$, and none of the pins $p_0, p_1, p_2, \ldots, p_{n-1}, p_n$ belong to the false pin set $P_F(I)$. There is preferably another condition by which a path of the timing interval I is defined, which additional condition is described below, after additional characteristics of the integrated circuit are described.

Many of the pins within the integrated circuit have a relationship one with other. For example, adjacent pins within a path of a timing interval I are called an edge. The edge of a pin pair $(p_1,p_2)$ is called a cell edge if the pin $p_1$ is an input pin of a given cell and the pin $p_2$ is an output pin of the same cell. A cell is a component element or block of component elements that have been logically grouped together as a unit within the integrated circuit. Thus, the pins of the cell edge pin pair $(p_1,p_2)$ are connected through the cell. The edge of a pin pair $(p_1,p_2)$ is a wire edge if the pin $p_1$ is an output pin of a first given cell and the pin $p_2$ is an input pin of a second given cell disposed downstream from the first given cell along the current path in question of the timing interval I. Thus, the pins of the wire edge pin pair $(p_1,p_2)$ are connected through a wire. Although physical wires, in a classical sense, are not typically used to connect circuits within an integrated circuit, this descriptive language is used to refer to the various different types of electrically conductive pathways that are fabricated within the integrated circuit.

Both cell edges and wire edges can be more generically referred to as timing edges. The additional criteria by which a path of the timing interval I is determined, as alluded to above, is that for all $k=1, 2, \ldots, n$ of the sequence of pins $p_0, p_1, p_2, \ldots, p_{n-1}, p_n$, the pin pair $(p_{k-1},p_k)$ is a timing edge. Thus, a path $P=\{p_0, p_1, p_2, \ldots, p_{n-1}, p_n\}$ goes through a pin p if $p=p_k$ for some $k=1, 2, \ldots, n$. By using the descriptive structure as described above, the integrated circuit can be represented by an oriented graph. The pins of the integrated circuit are represented as vertices on the graph, and the timing edges are represented as oriented edges of the graph.

The timing interval I has a time, as dictated by the design specification, at which the electrical signals traversing the various paths are to be completed. This is the required time $T_{Required}(I)$ of the timing interval I. At the conclusion of the timing driven resynthesis, all path delays of the timing interval I preferably have durations that are at most no more than the required time $T_{Required}(I)$. By determining and then adding all of the delays $D(p_1,p_2)$ between the timing edges of a path, a determination can be made as to whether the path as currently configured supports the required time $T_{Required}$ (I) of the timing interval I. The total delay $D(P,I)$ of the path P during the timing interval I is determined by:

$$D(P, I) = T_{Start}(p_0, I) + T_{End}(p_n, I) + \sum_{k=1}^{n} D(p_{k-1}, p_k)$$

where $T_{Start}(p_0,I)$ is the starting time of the signal on the first pin of the path P during the timing interval I, $T_{End}(p_n,I)$ is the ending time of the signal on the last pin of the path P during the timing interval I, and $D(p_{k-1},p_k)$ is the delay between each of the timing edges $(p_{k-1},p_k)$ of the path P during the timing interval I, which delays are summed for all of the timing edges $(p_{k-1},p_k)$ within the path P.

As mentioned above, each pin p may be associated with several paths P within which the pin p is included. For each pin p, the delays for all paths P of the timing interval I are preferably considered. The largest of the delays for all of these paths P is defined as the worst path delay $D_{Worst}(p,I)$ through the pin p for the timing interval I. If there is no path P of the timing interval I that includes the pin p, then the worst path delay $D_{Worst}(p,I)$ for the pin p is preferably set to negative infinity. If the worst path delay $D_{Worst}(p,I)$ for the pin p is greater in value than the required time $T_{Required}(I)$ of the timing interval I, then the pin p is preferably defined as a violation. Violations are preferably removed during the timing resynthesis procedure by iteratively changing the underlying characteristics of the integrated circuit on which the timing is based. The violation of the pin p for the timing interval I is calculated as $V(p,I)=D_{Worst}(p,I)-T_{Required}(I)$.

The longest of all of the worst path delays of the entire timing interval I is determined as the maximum of all of the worst path delays $D_{Worst}(p,I)$, or algebraically as $D_{Worst}(I)=\max_p\{D_{Worst}(p,I)\}$. The maximal violation of the entire timing interval I is determined as the maximum of all of the pin p violations $V(p,I)$, or algebraically as $V_{Max}(I)=D_{Worst}(I)-T_{Required}(I)=\max_p\{V(p,I)\}$.

The maximal violation $V_{Max}(I)$ and the maximal worst path delay $D_{Worst}(I)$ of the timing interval I are preferably used in the iterative timing driven resynthesis to identify the elements of the integrated circuit that most need to be changed in order to bring the timing of the integrated circuit within the design criteria. As these elements are changed and the timing of the integrated circuit is improved, the iterative analysis preferably identifies other maximal violations $V_{Max}(I)$ and maximal worst path delays $D_{Worst}(I)$ of the timing interval I, which can then in turn be iteratively improved until the timing for the integrated circuit is at least within a desired level, preferably within the specifications of the design criteria.

The worst path delays $D_{Worst}(p,I)$ as described above are preferably determined from the signal arrival times and signal departure times for each pin p within a path P of a given timing interval I. The arrival time $T_{Arr}(p_r, P, I)$ for a given pin $p_r$ within a path P of a timing interval I is preferably determined from the starting time $T_{Start}(p_0,I)$, of the signal on the starting pin $p_0$ of the path P of the timing interval I, and the sum of the delays of the timing edges $D(p_{k-1},p_k)$ occurring along the signal path P prior to the arrival of the signal at the given pin $p_r$, as follows:

$$T_{Arr}(p_r, P, I) = T_{Start}(p_0, I) + \sum_{k=1}^{r} D(p_{k-1}, p_k)$$

Similarly, the departure time $T_{Dep}(p_r,P,I)$ for a given pin $P_r$ within a path P of a timing interval I is preferably determined from the ending time $T_{End}(p_n,I)$, of the signal on the ending pin $p_n$ of the path P of the timing interval I, and the sum of the delays of the timing edges $D(p_{k-1},p_k)$ occurring downstream along the signal path P from the given pin $p_r$, as follows:

$$T_{Dep}(p_r, P, I) = T_{End}(p_n, I) + \sum_{k=r+1}^{n} D(p_{k-1}, p_k)$$

The maximum arrival time $T_{Arr}(p,P,I)$ for a given pin p within a path P of a timing interval I is preferably designated as the arrival time of the pin p for the timing interval I, and is given as $T_{Arr}(p,I)$. Similarly, The maximum departure time $T_{Dep}(p,P,I)$ for a given pin p within a path P of a timing interval I is preferably designated as the departure time of the pin p for the timing interval I, and is given as $T_{Dep}(p,I)$. Thus, for any path P that includes a pin p, the path delay D(P,I) for the path P of the timing interval I is given as $D(P,I)=T_{Arr}(p,P,I)+T_{Dep}(p,P,I)$. Therefore, for any given pin p and timing interval I, the worst path delay for a pin p is determined from the maximum arrival time for the pin p and the maximum departure time from the pin p, as given by $D_{Worst}(p,I)=T_{Arr}(p,I)+T_{Dep}(p,I)$.

It is desirable to identify the pins that are within the paths P of the timing interval I, as alluded to above. The pins are preferably identified as belonging to at least one of a timing input cone of pins or a timing output cone of pins. The input cone is preferable defined as $C_{In}(S,S_0)$, where S is a set of pins and $S_0$ is a subset of S. Specifically, S is the universe of the pins that are in question, which may be all of the pins within a given integrated circuit, or may be a smaller group of pins within the integrated circuit. $S_0$ is a set of pins that are known to exist within the paths P of the timing interval I in question. In other words, $S_0$ is a set of pins that is selected to specify the specific input cone $C_{In}(S,S_0)$ in question.

The input cone $C_{In}(S,S_0)$ is preferably defined according to a recursive procedure as next given. Initially, the input cone $C_{In}(S,S_0)$ is preferably set to be equal to just $S_0$, which is the set of pins known to exist within the input cone $C_{In}(S,S_0)$. A pin $p_2$ of the set $S_0$ is preferably inspected to determine whether there exists a timing edge $(p_1,p_2)$. If the timing edge $(p_1,p_2)$ exists, and if the point $p_1$ is not already included within the input cone $C_{In}(S,S_0)$, then the point $p_1$ is added to the input cone $C_{In}(S,S_0)$. This procedure is preferably iteratively repeated until all pins $p_2$ that exist within the input cone $C_{In}(S,S_0)$ have been inspected, and no more pins $p_1$ are found that are not already included within the input cone $C_{In}(S,S_0)$. Thus, the input cone $C_{In}(S,S_0)$ is the set of pins that may be considered to be upstream from the set of pins $S_0$.

The output cone is preferable defined as $C_{Out}(S,S_0)$, where S is a set of pins and $S_0$ is a subset of S. Specifically, S is the universe of the pins that are in question, which may be all of the pins within a given integrated circuit, or may be a smaller group of pins within the integrated circuit. $S_0$ is a set of pins that are known to exist within the paths P in question. In other words, $S_0$ is a set of pins that is selected to specify the specific output cone $C_{Out}(S,S_0)$ in question.

The output cone $C_{Out}(S,S_0)$ is preferably defined according to a recursive procedure as next given. Initially, the output cone $C_{Out}(S,S_0)$ is preferably set to be equal to just $S_0$, which is the set of pins known to exist within the output cone $C_{Out}(S,S_0)$. A pin $p_1$ of the set $S_0$ is preferably inspected to determine whether there exists a timing edge $(p_1,p_2)$. If the timing edge $(p_1,p_2)$ exists, and if the point $p_2$ is not already included within the output cone $C_{Out}(S,S_0)$, then the point $p_2$ is added to the output cone $C_{Out}(S,S_0)$. This procedure is preferably iteratively repeated until all pins $p_1$ that exist within the output cone $C_{Out}(S,S_0)$ have been inspected, and no more pins $p_2$ are found that are not already included within the output cone $C_{Out}(S,S_0)$. Thus, the output cone $C_{Out}(S,S_0)$ is the set of pins that may be considered to be downstream from the set of pins $S_0$.

The timing driven resynthesis is preferably commenced with an initial timing computation. The initial timing computation preferably finds the set of all pins p of the timing interval I and computes the arrival and departure times of each of the pins p in the set, using the methods as described above. As mentioned above, a pin p is a pin of the timing interval I if there is path P of the timing interval I that goes through the pin p. The set of pins p of the timing interval I are denoted by S(I). The pins S(I) of the timing interval I are found by intersecting the timing input cone and the timing output cone. The timing input cone and the time output cone are determining as generally given above, with the specific case that $S_0$ for the timing input cone comprises $P_E(I)$ and $S_0$ for the timing output cone comprises $P_S(I)$. For both the timing input cone and the timing output cone, the set S of all of the pins p in the integrated circuit is reduced by the false pins $P_F(I)$ of the timing interval I.

Thus, the timing input cone of the timing interval I is given by $S_{In}(S/P_F(I),P_E(I))$ and the timing output cone of the timing interval I is given by $S_{Out}(S/P_F(I),P_S(I))$. The arrival times and departure times of all pins S(I) of the timing interval I are preferably determined, and the arrival times and departure times of all other pins p of the integrated circuit are preferably set as equal to negative infinity.

Timing driven resynthesis preferably incorporates local optimization procedures. Thus, after one or more steps of local optimization, one or more timing edge delays are preferably changed. New timing edges can also be created, such as by inserting new cells, for example. The set of all pins p belonging to either a changed timing edge or a new timing edge is denoted as D. Preferably, the arrival times of the pins p of the timing output cone based on D are recomputed, and the departure times of the pins p of the timing input cone based on D are recomputed. In other words, $S_0$ is set equal to D, and the pins p of the timing cones are determined as given above. Presumably, the arrival and departure times of all other pins p have not changed as a result of the preceding local optimization step, and are therefore preferably not recomputed.

Because the procedure as given above preferably repeatedly calculates the arrival and departure times for a number of pins p, it is highly desirable to have a timing computation method that is relatively fast, so that the overall time required for the timing computation is reduced. The steps of such a method for the calculation of the arrival times of all pins p in a given set R is given below. A flow chart for the method is given in the figure. It is appreciated that the method for the calculation of the departure times of the pins p in the set R is quite similar and included within the scope of this disclosure, even though it is not specifically presented as the example below.

To determine the arrive time for a pin p, all pins $p_k$ are preferably identified, where k=1, 2, 3, . . . , n and $p_1$, $p_2$, $p_3$, . . . , $p_n$ are pins and $(p_k,p)$ is a timing edge. The arrival time of the pin p is preferably equal to the maximum of the value $T_{Arr}(p_k,I)+D(p_k,p)$, or in other words, the maximum of the sum of the arrival time of the leading pin $p_k$ of the timing edge and the timing delay between the leading pin $p_k$ and the pin p, as determined for all $p_k$. In the case where p is a starting pin of the timing interval I, the starting time of the pin p is preferably accounted for.

Thus, the arrival times for all pins $p_k$ are preferably collected for the computation of the arrival time of the pin p. If some pin $p_k$ belongs to the set R, then the arrival time of the pin $p_k$ should preferably be computed before the computation of the arrival time of the pin p. Therefore, the pins of the set R are preferably ordered in some manner for the determination of arrival times. In other words, if $(p_k,p)$ is a timing edge, and both of the pins $p_k$ and p are members of the set of pins R, then the calculation of the arrival time for pin $p_k$ is preferably accomplished prior to the calculation of the arrival time for pin p. Stated in yet another way, pin $p_k$ is preferably given a higher priority for recomputation than pin p, or a lower number in the assigned order for recomputation than pin p.

The pins of the set R are preferably assigned numbers in an enumeration to define the ordering of the recalculation. Preferably, the lower the number assigned to the pin, the earlier the arrival time for the pin is recalculated in reference to the other pins of the set R. For each pin p of the set R there is preferably defined a counter C(p) to count the number of pins $p_k$ where $p_k$ is included within the set R and $(p_k,p)$ is a timing edge. This determination is made as given in block 20 of the figure. If for some pin p the value of C(p) is zero as given in block 40, then there is no such pin p of the set R that is more preferable for the enumeration, and a number can preferably be assigned to the pin p immediately as given in block 60.

Once the number is assigned to the pin p, the pin p is preferably removed from the set R as given in block 60, and for each pin p that is a member of the set R such that $(p,p_0)$ is a timing edge, the value of $C(p_0)$ is preferably decreased by 1 as given in block 70. Preferably, this is iteratively repeated until the set R is empty as given in block 30. If the set R is not empty and the value C(p) is nonzero for all pins left within the set R, then there is probably a cycle in the structure of the integrated circuit as given in block 50. In this case, the arrival times of some of the pins are not able to be readily computed.

The arrival times for the pins of the set R are preferably calculated according to the order in which they were removed from the set R as given above as in block 80. The arrival time for a pin p is preferable calculated as next given. If the pin p is a member of the starting set $P_S(I)$ of pins p, then the arrival time $T_{Arr}(p)$ of the pin p is preferably set as equal to starting time $T_{Start}(p)$ of the pin p. If the pin p is not a member of the starting set $P_S(I)$ of pins p, then the arrival time $T_{Arr}(p)$ of the pin p is preferably set as equal to negative infinity. The next step is preferably to find all pins $p_0$ such that $(p_0,p)$ is a timing edge. For each pin $p_0$ that is found, the arrival time $T_{Arr}(p)$ is preferably set to be equal to the greater of either the arrival time $T_{Arr}(p)$ assigned above, or the arrival time of the preceding pin $p_0$ of the timing edge, given as $T_{Arr}(p_0)$, plus the timing delay of the timing edge, given as $D(p_0,p)$.

In this manner, a method is presented by which the pins p of a set R may be ordered for a fast recomputation of the arrival time. As mentioned above, this method also comprehends an ordering for a fast recomputation of the departure time for the pins p of the set R, with appropriate modification of the input as described above.

Preferably, once the timing resynthesis is completed and all timing issues with the integrated circuit design have been resolved, the integrated circuit design is used to create mask layers and process flows whereby the integrated circuit design is physically embodied in an integrated circuit.

In other embodiments, the method of the invention is embodied in a computer program on a physical media, which computer program has logic elements for instructing a computing device to accomplish the method as described above. The invention may also be embodied in a computing device, which has inputs, outputs, memory, and a processor, which function in cooperation to accomplish the method as described above.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally, and equitably entitled.

What is claimed is:

1. A method of computing timing delays of timing edges of a path of an integrated circuit design, the method comprising the steps of:

identifying all pins within the path, identifying all timing edges defined by the pins within the path, identifying all pins within the path that are a leading pin of one of the timing edges in the path, for each given pin within the path, tabulating a number of pins that are upstream from the given pin along a contiguous series of the timing edges in the path, assigning a computational rank to the given pin based upon the tabulated number for the given pin, ordering the timing edges for computation based upon the computational rank of the leading pin of each timing edge in the path to produce an ordered list of timing edges, and computing the timing delays of the timing edges of the path according to the ordered list of timing edges.

2. A method of resynthesizing an integrated circuit design, the method comprising the steps of:

identifying a timing output cone based on a starting set of pins of the integrated circuit design, identifying a timing input cone based on an ending set of pins of the integrated circuit design, intersecting the timing input cone and the timing output cone to produce an intersection defining a path, computing timing delays of timing edges of the path using the method of claim 1, computing the arrival times of the pins of the path based on the timing delays of the timing edges of the path, computing the departure times of the pins of the path based on the timing delays of the timing edges of the path, computing the total delay of the path from the arrival times and the departure times of the pins of the path, comparing the total delay of the path to a required time of the path, and if the total delay of the path is greater than the required time of the path, then making a change to the integrated circuit design and recomputing the total delay of the path in an iterative fashion until the total delay of the path is no greater than the required time of the path.

3. The method of claim 2 wherein the step of making a change to the integrated circuit design comprises changing at least one existing timing edge.

4. The method of claim 2 wherein the step of making a change to the integrated circuit design comprises inserting at least one new timing edge.

5. A computer program on a computer readable media, the computer program physically embodying a method of computing timing delays of timing edges of a path of an integrated circuit design, the computer program comprising logic elements for:

identifying all pins within the path, identifying all timing edges defined by the pins within the path, identifying all pins within the path that are a leading pin of one of the timing edges in the path, for each given pin within the path, tabulating a number of pins that are upstream from the given pin along a contiguous series of the timing edges in the path, assigning a computational rank to the given pin based upon the tabulated number for the given pin, ordering the timing edges for computation based upon the computational rank of the leading pin of each timing edge in the path to produce an ordered list of timing edges, and computing the timing delays of the timing edges of the path according to the ordered list of timing edges.

6. A computer program on a computer readable media, the computer program physically embodying a method of resynthesizing an integrated circuit design, the computer program comprising logic elements for:

identifying a timing output cone based on a starting set of pins of the integrated circuit design, identifying a timing input cone based on an ending set of pins of the integrated circuit design, intersecting the timing input cone and the timing output cone to produce an intersection defining a path, computing timing delays of timing edges of the path using the computer program of claim 5, computing the arrival times of the pins of the path based on the timing delays of the timing edges of the path, computing the departure times of the pins of the path based on the timing delays of the timing edges of the path, computing the total delay of the path from the arrival times and the departure times of the pins of the path, comparing the total delay of the path to a required time of the path, and if the total delay of the path is greater than the required time of the path, then making a change to the integrated circuit design and recomputing the total delay of the path in an iterative fashion until the total delay of the path is no greater than the required time of the path.

7. The computer program of claim 5 wherein the logic element for making a change to the integrated circuit design comprises changing at least one existing timing edge.

8. The computer program of claim 5 wherein the logic element for making a change to the integrated circuit design comprises inserting at least one new timing edge.

9. The computer program of claim 5 wherein the logic element for making a change to the integrated circuit design comprises:

producing an output requesting the change to the integrated circuit design, and receiving an input of the change to the integrated circuit design.

10. A computing device for computing timing delays of timing edges of a path of an integrated circuit design, the computing device comprising:

an input for receiving information in regard to the integrated circuit design, a memory for storing the information and logic elements, an output for outputting the information and data based on the information, and a processor for processing the logic elements stored in the memory and thereby manipulating the information by,
identifying all pins within the path,
identifying all timing edges defined by the pins within the path,
identifying all pins within the path that are a leading pin of one of the timing edges in the path,
for each given pin within the path, tabulating a number of pins that are upstream from the given pin along a contiguous series of the timing edges in the path,
assigning a computational rank to the given pin based upon the tabulated number for the given pin,
ordering the timing edges for computation based upon the computational rank of the leading pin of each timing edge in the path to produce an ordered list of timing edges, and
computing the timing delays of the timing edges of the path according to the ordered list of timing edges.

11. The computing device of claim 10 wherein the processor resynthesizes an integrated circuit design by manipulating the information by:

identifying a timing output cone based on a starting set of pins of the integrated circuit design, identifying a timing input cone based on an ending set of pins of the integrated circuit design, intersecting the timing input cone and the timing output cone to produce an intersection defining a path, identifying all pins within the path, identifying all timing edges defined by the pins within the path, identifying all pins within the path that are a leading pin of one of the timing edges in the path, for each given pin within the path, tabulating a number of pins that are upstream from the given pin along a contiguous series of the timing edges in the path, assigning a computational rank to the given pin based upon the tabulated number for the given pin, ordering the timing edges for computation based upon the computational rank of the leading pin of each timing edge in the path to produce an ordered list of timing edges, computing the timing delays of the timing edges of the path according to the ordered list of timing edges, computing the arrival times of the pins of the path based on the timing delays of the timing edges of the path, computing the departure times of the pins of the path based on the timing delays of the timing edges of the path, computing the total delay of the path from the arrival times and the departure times of the pins of the path, comparing the total delay of the path to a required time of the path, and if the total delay of the path is greater than the required time of the path, then making a change to the integrated circuit design and recomputing the total delay of the path in an iterative fashion until the total delay of the path is no greater than the required time of the path.

* * * * *